(12) United States Patent
Nath et al.

(10) Patent No.: US 8,281,121 B2
(45) Date of Patent: Oct. 2, 2012

(54) PRIVATE AGGREGATION OF DISTRIBUTED TIME-SERIES DATA

(75) Inventors: Suman Nath, Redmond, WA (US); Vibhor Rastogi, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 329 days.

(21) Appl. No.: 12/779,789

(22) Filed: May 13, 2010

(65) Prior Publication Data
US 2011/0283099 A1 Nov. 17, 2011

(51) Int. Cl.
H04L 29/06 (2006.01)
(52) U.S. Cl. ...................................................... 713/150
(58) Field of Classification Search .................. 713/150
See application file for complete search history.

(56) References Cited

U.S. PATENT DOCUMENTS

| | | | |
|---|---|---|---|
| 7,856,100 B2 * | 12/2010 | Wang et al. | 380/30 |
| 2003/0091184 A1 * | 5/2003 | Chui | 380/37 |
| 2007/0087756 A1 * | 4/2007 | Hoffberg | 455/450 |
| 2007/0143289 A1 | 6/2007 | Dwork et al. | |
| 2008/0209568 A1 | 8/2008 | Chang et al. | |
| 2009/0077148 A1 * | 3/2009 | Yu et al. | 708/300 |
| 2009/0326926 A1 | 12/2009 | Landau et al. | |
| 2010/0030544 A1 | 2/2010 | Gopalan et al. | |

OTHER PUBLICATIONS

Zhu, et al., "On Privacy in Time Series Data Mining", Retrieved at << http://www.csuohio.edu/engineering/ece/research/techReport/2007/privacydm.pdf >>, Sep. 30, 2007, pp. 1-24.

Singh, et al., "Privacy Preserving Burst Detection of Distributed Time Series Data Using Linear Transforms", Retrieved at << http://ieeexplore.ieee.org/stamp/stamp.jsp?tp=&arnumber=4221361 >>, Proceedings of the IEEE Symposium on Computational Intelligence and Data Mining, CIDM 2007, part of the IEEE Symposium Series on Computational Intelligence 2007, Apr. 1-5, 2007, pp. 646-653.

Bianchi, et al., "Implementing the Discrete Fourier Transform in the Encrypted Domain", Retrieved at << http://ieeexplore.ieee.org/stamp/stamp.jsp?tp=&arnumber=4517970 >>, In Proceedings of IEEE International Conference on Acoustics, Speech and Signal Processing (ICASSP '08), Mar.-Apr. 2008, pp. 1757-1760.

Clifton, et al., "Collaborative Research: ITR: Distributed Data Mining to Protect Information Privacy", Retrieved at << http://www.cs.purdue.edu/homes/clifton/DistDM/ppddm_nsf.pdf >>, 2007, pp. 1-17.

(Continued)

*Primary Examiner* — Jeffrey Pwu
*Assistant Examiner* — Jayesh Jhaveri (57) ABSTRACT

Techniques are described herein for privately aggregating distributed time-series data. A requestor provides a query sequence to users. Each user evaluates the query sequence on the user's time-series data to determine an answer sequence. Each user transforms its answer sequence to another domain, adds noise, and encrypts it for further processing by the requestor. The requestor combines these encrypted sequences in accordance with a homomorphic encryption technique to provide an encrypted summation sequence. The requestor provides the encrypted summation sequence to at least some of the users, who may in turn provide respective decryption shares to the requestor. The requestor combines the decryption shares in an effort to decrypt the encrypted summation sequence. Decrypting the encrypted summation sequence provides a summation of the encrypted sequences from the users, which may be transformed back to the original domain to estimate a summation of the answer sequences of the users.

20 Claims, 8 Drawing Sheets

OTHER PUBLICATIONS

Mörchen, Fabian., "Time Series Feature Extraction for Data Mining using DWT and DFT", Retrieved at << http://www.mybytes.de/papers/moerchen03time.pdf >>, Technical Report, No. 33, Nov. 5, 2003, pp. 1-31.

Xue, Feng., "Efficient Similarity Search in Sequence Databases", Retrieved at << http://www.cs.uwaterloo.ca/~david/cs848/presentation-similarity-fengxue.pdf >>, pp. 7.

Blæesild, P., "The Two-dimensional Hyperbolic Distribution and Related Distributions, with an Application to Johannsen's Bean Data", Retrieved at << http://biomet.oxfordjournals.org/cgi/content/abstract/68/1/251 >>, Apr. 1981, pp. 2.

Blum, et al., "The SULQ Framework", Retrieved at << http://66.102.9.132/search?q=cache%3A3o4NjvesidsJ%3Aresearch.microsoft.com%2Fen-us%2Fprojects%2Fdatabaseprivacy%2Fbdmn.pdf+The+suLQ+framework&hl=en >>, Symposium on Principles of Database Systems, Proceedings of the twenty-fourth ACM SIGMOD-SIGACT-SIGART symposium on Principles of database systems, Jun. 13-15, 2005, pp. 20.

Cramer, et al., "Multiparty Computation from Threshold Homomorphic Encryption", Retrieved at << http://www.iacr.org/archive/eurocrypt2001/20450279.pdf >>, Lecture Notes in Computer Science, vol. 2045, Proceedings of the International Conference on the Theory and Application of Cryptographic Techniques: Advances in Cryptology, May 6-10, 2001, pp. 279-298.

Dwork, Cynthia., "Differential Privacy: A Survey of Results", Retrieved at << http://66.102.9.132/search?q=cache%3AGSUstzCjfNYJ%3Aresearch.microsoft.com%2Fen-us%2Fprojects%2FDatabasePrivacy%2Ftamc_survey.pdf+Di%C2%AEerential+privacy%3A+A+survey+of+results&hl=en >>, Theory and Applications of Models of Computation, 5th International Conference, TAMC 2008, Apr. 25-29, 2008, pp. 21.

Dwork, et al., "Our Data, Ourselves: Privacy Via Distributed Noise Generation", Retrieved at << http://theory.stanford.edu/~kngk/papers/ourDataOurselves.pdf >>, Eurocrypt, May 2006, pp. 18.

Dwork, et al., "Calibrating Noise to Sensitivity in Private Data Analysis", Retrieved at << http://people.csail.mit.edu/asmith/PS/sensitivity-tcc-final.pdf >>, Third Theory of Cryptography Conference (TCC 2006), Mar. 2006, pp. 1-20.

Eisenman, et al., "The Bikenet Mobile Sensing System for Cyclist Experience Mapping", Retrieved at << http://www.cs.dartmouth.edu/~sensorlab/pubs/BikeNet-SenSys07.pdf >>, Conference on Embedded Networked Sensor Systems, Proceedings of the 5th international conference on Embedded networked sensor systems, Nov. 6-9, 2007, pp. 15.

Evfimievski, et al., "Limiting Privacy Breaches in Privacy Preserving Data Mining", Retrieved at << http://www.cs.cornell.edu/johannes/papers/2003/pods03-privacy.pdf >>, Symposium on Principles of Database Systems, Proceedings of the twenty-second ACM SIGMOD-SIGACT-SIGART symposium on Principles of database systems, Jun. 9-11, 2003, pp. 12.

Fouque, et al., "Sharing Decryption in the Context of Voting or Lotteries", Retrieved at << http://reference.kfupm.edu.sa/content/s/h/sharing_decryption_in_the_context_of_vot_138805.pdf >>, Lecture Notes in Computer Science, vol. 1962, Proceedings of the 4th International Conference on Financial Cryptography, Feb. 20-24, 2000, pp. 15.

Ganti, et al., "Poolview: Stream Privacy for Grassroots Participatory Sensing", Retrieved at <<http://www.cs.dartmouth.edu/~tanzeem/teaching/CS188-Winter09/readings/p281-ganti.pdf >>, Conference on Embedded Networked Sensor Systems, Proceedings of the 6th ACM conference on Embedded network sensor systems, Nov. 5-7, 2008, pp. 281-294.

Goldreich, Oded., "Secure Multi-party Computation", Retrieved at << http://citeseer.ist.psu.edu/cache/papers/cs/33396/http:zSzzSzphilby.ucsd.eduzSzcryptolibzSzBOOKSzSz..zSzpsfileszSzsc_oded.pdf/goldreich98secure.pdf >>, Working Draft, Version 1.1, Sep. 21, 1998, pp. 109.

Gritzalis, Dimitris., "Secure Electronic Voting", Retrieved at << http://www.terena.org/activities/tf-csirt/meeting7/gritzalis-electronic-voting.pdf >>, 7th Computer Security Incidents Response Teams Workshop, Sep. 2002, pp. 1-21.

Guha, et al., "Serving Ads from Localhost for Performance, Privacy, and Profit", Retrieved at << http://adresearch.mpi-sws.org/privadworkshop.pdf >>, Proceedings of Hot Topics in Networking (HotNets), Oct. 2009, pp. 6.

Hay, et al., "Boosting the Accuracy of differentially-private Queries through Consistency", Retrieved at << http://www.cs.umass.edu/~miklau/pubs/social/hay2009boosting.pdf >>, CoRR, vol. abs/0904.0942, 2009, pp. 1-17.

Hull, et al., "Cartel: A Distributed Mobile Sensor Computing System", Retrieved at << http://db.csail.mit.edu/pubs/fp02-hull.pdf >>, Conference on Embedded Networked Sensor Systems, Proceedings of the 4th international conference on Embedded networked sensor systems, Oct. 31-Nov. 3, 2006, pp. 14.

Krumm, John., "A Survey of Computational Location Privacy", Retrieved at << http://citeseerx.ist.psu.edu/viewdoc/download?doi=10.1.1.87.8556&rep=rep1&type=pdf >>, Personal and Ubiquitous Computing, vol. 13, No. 6, Aug. 2009, pp. 1-7.

Krumm, et al., "Predestination: Where Do You Want to Go Today?", Retrieved at << http://66.102.9.132/search?q=cache%3ACeJG9v0N_a0J%3Aresearch.microsoft.com%2Fen-us%2Fum%2Fpeople%2Fhorvitz%2Fpredestination-ieee.pdf+Predestination%3A+Where+do+you+want+to+go+today%3F&hl=en >>, Computer, vol. 40, No. 4, Apr. 2007, pp. 6.

Machanavajjhala, et al., "L-diversity: Privacy Beyond K-anonymity", Retrieved at << http://www.cs.colostate.edu/~cs656/reading/ldiversity.pdf >>, ACM Transactions on Knowledge Discovery from Data (TKDD), vol. 1, No. 1, Mar. 2007, pp. 1-12.

McSherry, et al., "Mechanism Design via Differential Privacy", Retrieved at << http://citeseerx.ist.psu.edu/viewdoc/download?doi=10.1.1.84.56&rep=rep1&type=pdf >>, FOCS, Proceedings of the 48th Annual IEEE Symposium on Foundations of Computer Science, Oct. 21-23, 2007, pp. 10.

Papadimitriou, et al., "Time series compressibility and privacy", Retrieved at << http://citeseerx.ist.psu.edu/viewdoc/download;jsessionid=AE3B1E51F12D590208E11CFEB10FA8-45?doi=10.1.1.66.7150&rep=rep1&type=pdf >>, Very Large Data Bases, Proceedings of the 33rd international conference on Very large data bases, Sep. 23-27, 2007, pp. 459-470.

Rastogi, et al., "Relationship privacy: Output Perturbation for Queries with Joins", Retrieved at << http://www.cs.washington.edu/homes/vibhor/pods59-rastogi.pdf >>, Symposium on Principles of Database Systems, Proceedings of the twenty-eighth ACM SIGMOD-SIGACT-SIGART symposium on Principles of database systems, Jun. 29-Jul. 1, 2009, pp. 10.

Rastogi, et al., "The Boundary between Privacy and Utility in Data Publishing", Retrieved at << http://www.cs.washington.edu/homes/suciu/paper-privacy-utility-vldb2007.pdf >>, Very Large Data Bases, Proceedings of the 33rd international conference on Very large data bases, Sep. 23-27, 2007, pp. 12.

Shamir, Adi., "How to Share a Secret", Retrieved at << http://www.caip.rutgers.edu/~virajb/readinglist/shamirturing.pdf >>, Communications of the ACM, vol. 22, No. 11, Nov. 1979, pp. 612-613.

Shilton, et al., "Designing the personal data stream: Enabling participatory privacy in mobile personal sensing.", Retrieved at << http://escholarship.org/uc/item/4sn741ns# >>, Jan. 1, 2009, pp. 19.

Sweeney, Latanya., "K-anonymity: A Model for Protecting Privacy", Retrieved at << http://epic.org/privacy/reidentification/Sweeney_Article.pdf >>, International Journal of Uncertainty, Fuzziness and Knowledge-Based Systems, vol. 10, No. 5, Oct. 2002, pp. 1-14.

Xiao, et al., "Differential Privacy via Wavelet Transforms", Retrieved at << http://arxiv.org/PS_cache/arxiv/pdf/0909/0909.5530v1.pdf >>, Proceedings of the 26th International Conference on Data Engineering, ICDE 2010, Mar. 1-6, 2010, pp. 15.

Yao, Andrew C., "Protocols for Secure Computations (extended abstract)", Retrieved at << http://www.cs.wisc.edu/areas/sec/yao1982-ocr.pdf >>, 23rd Annual Symposium on Foundations of Computer Science, Nov. 3-5, 1982, pp. 1-5.

Jonhson, et al, Continuous Univariate Distributions, (second ed., vol. 1, chapter 18), pp. 207-227.

Wikipedia the Free Encyclopedia, Chi-square distribution, <http://en.wikipedia.org/wiki/Chi-square_distribution>, Retrieved on Aug. 16, 2010, 7 pages.

* cited by examiner

PRIVATE AGGREGATION OF DISTRIBUTED TIME-SERIES DATA

BACKGROUND

The ever increasing instrumentation of the physical and the virtual worlds provides an unprecedented opportunity to collect useful data from diverse sources and to mine such data for understanding phenomena. Participatory data mining techniques are commonly used for this purpose. Participatory data mining techniques enable a requestor to aggregate queries for mining information that is extracted from time-series data that is collected by individual users. However, users may not be willing to reveal true values of data for various reasons, such as privacy considerations.

Random perturbation is commonly used to introduce uncertainty about individual data values. However, random perturbation techniques often do not adequately support time-series data and distributed sources, both of which characterize participatory data mining techniques. For example, many such techniques typically assume that correlations among data are negligible, though data at successive timestamps from a common source may be highly correlated. Even if answers to a query sequence are independently perturbed, the perturbations often can be distinguished from the original answers and filtered out if the time-series exhibits a pattern or relatively strong correlation. Moreover, if successive query answers are correlated and noise is added independently to each answer, the amount of noise required to hide the correlation can be extremely large, making the noisy answers practically useless for a long sequence of queries. Furthermore, such techniques usually assume existence of a trusted third party for introducing noise with respect to the data. The trusted third party typically has access to true values of the data before the noise is introduced, thereby exposing the data to risk of a privacy attack.

In absence of a trusted third party, users often perturb their data before publishing the data to the requestor. However, if users perturb their data independently, the noise variance in the perturbed estimate grows linearly with the number of users, which may reduce the utility of the aggregate data. To improve utility, cryptographic techniques, such as Secure Multiparty Computation, can be used to compute accurate perturbed estimates in a distributed setting. However, the computational performance of such cryptographic techniques does not scale well with a relatively high number of users.

SUMMARY

Various approaches are described herein for, among other things, privately aggregating distributed time-series data. For example, the distributed time series data may include global positioning system (GPS) location traces, Web browsing history, personal health information, etc. A requestor provides a query sequence to users. Each user evaluates the query sequence on the user's time-series data to determine a resulting answer sequence. Each user transforms its answer sequence to another domain, adds noise to the transformed answer sequence, and encrypts the noisy transformed answer sequence for further processing by the requestor.

The requestor combines the encrypted noisy transformed answer sequences from the users in accordance with a homomorphic encryption technique to provide an encrypted summation sequence. Homomorphic encryption is a type of encryption in which an operation (e.g., an algebraic operation) can be performed with respect to plaintext with a (possibly different) operation performed with respect to ciphertext. Plaintext is a non-encrypted form of a message, such as text. Ciphertext is an encrypted form of a message, such as text.

The requestor provides the encrypted summation sequence to at least some of the users, who may in turn provide respective decryption shares to the requestor. The requestor combines the decryption shares in an effort to decrypt the encrypted summation sequence. For instance, the requestor may decrypt the encrypted summation sequence if a threshold number of users provide their decryption shares. Decrypting the encrypted summation sequence provides a summation of the noisy transformed answer sequences from the users. The requestor transforms this summation back to the original domain to provide an estimate of a summation of the answer sequences of the users.

An example method is described in which a query sequence that includes a plurality of queries is received from a requestor. An answer sequence that includes a plurality of answers that corresponds to the plurality of respective queries is determined. A first representation of the answer sequence in a first domain is transformed to a second representation of the answer sequence in a second domain. The first representation includes first coefficients that correspond to the respective answers. The second representation includes second coefficients. The number of the second coefficients is less than the number of the first coefficients. Noise is added to the second coefficients to provide a noisy representation of the second coefficients in the second domain. The noisy representation is encrypted in accordance with a homomorphic encryption technique to provide an encrypted estimate of the first representation to the requestor.

Another example method is described in which a query sequence that includes a plurality of queries is provided to users. An encrypted representation of a plurality of coefficients is received from each user. Each plurality of coefficients represents a transformation of a respective answer sequence from a first domain to a second domain. Each answer sequence includes N answers that include noise. The encrypted representations are combined in accordance with a homomorphic encryption technique to provide an encrypted summation sequence that includes summations that correspond to respective coefficients of each plurality of coefficients. The encrypted summation sequence is provided to at least a threshold number of the users. Decryption shares that are based on the encrypted summation sequence are received from at least the threshold number of the respective users. The encrypted summation sequence is decrypted in accordance with a threshold decryption technique to provide a decrypted summation sequence based on the decryption shares of at least the threshold number of the users. The decrypted summation sequence in the second domain is transformed to a second summation sequence that includes second summations in the first domain. Each of the second summations is an estimate of a summation of the answers that correspond to a respective query of the query sequence.

An example system is described that includes an answer module, a transform module, a noise module, an inverse transform module, an encryption module, and an inverse transform module. The answer module determines an answer sequence that includes a plurality of answers that corresponds to a plurality of respective queries that are included in a query sequence that is received from a requestor. The transform module transforms a first representation of the answer sequence in a first domain to a second representation of the answer sequence in a second domain. The first representation includes first coefficients that correspond to the respective answers. The second representation includes second coefficients. The number of the second coefficients is less than the number of the first coefficients. The noise module adds noise to the second coefficients to provide a noisy representation of the second coefficients in the second domain. The encryption module encrypts the noisy representation in accordance with a homomorphic encryption technique to provide an encrypted representation of the plurality of second coefficients to the requestor.

Another example system is described that includes a query module, a homomorphic encryption module, a threshold decryption module, and an inverse transform module. The query module provides a query sequence that includes a plurality of queries to users. The homomorphic encryption module combines encrypted representations, each including a respective plurality of coefficients, that are received from the respective users in accordance with a homomorphic encryption technique to provide an encrypted summation sequence. Each plurality of coefficients represents a transformation of a respective answer sequence from a first domain to a second domain. Each answer sequence includes a plurality of answers that include noise. Each plurality of answers corresponds to the plurality of respective queries. The encrypted summation sequence includes a plurality of summations that correspond to respective coefficients of each plurality of coefficients. The homomorphic encryption module provides the encrypted summation sequence to at least a threshold number of the users. The threshold decryption module decrypts the encrypted summation sequence in accordance with a threshold decryption technique based on decryption shares that are received from at least the threshold number of the respective users to provide a decrypted summation sequence. The decryption shares are based on the encrypted summation sequence. The inverse transform module transforms the decrypted summation sequence in the second domain to a second summation sequence that includes second summations in the first domain. Each of the second summations is an estimate of a summation of the answers that correspond to a respective query of the query sequence.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

II. Example Embodiments

Example embodiments described herein are capable of privately aggregating distributed time-series data (e.g., global positioning system (GPS) location traces, Web browsing history, personal health information, etc.). A requestor (a.k.a. an aggregator) provides a query sequence Q to users, each of whom evaluates the query sequence on the user's time-series data $I_u$ to determine a resulting answer sequence. For instance, a user's data $I_u$ may be modeled as uni-variate or multi-variate time-series data. The combined time-series data I of all U users may be denoted $I=I_1 \cup I_2 \ldots \cup I_U$. In accordance with example embodiments, I is not computed, though the requestor wishes to compute aggregate queries over I.

Instead, upon receiving the query sequence Q, each user computes a respective answer sequence, transforms the answer sequence to another domain, adds noise to the transformed answer sequence, and encrypts the noisy transformed answer sequence for further processing by the requestor. For example, the noise that is added to the transformed answer sequence may be Laplace noise or any other suitable type of noise. Laplace noise is noise that is generated in accordance with a Laplace distribution. Further detail regarding some example techniques by which a user may answer a query sequence are provided below with reference to FIGS. 2A, 2B, and 3.

The requestor combines the encrypted noisy transformed answer sequences from the users in accordance with a homomorphic encryption technique to provide an encrypted summation sequence. The requestor provides the encrypted summation sequence to at least a threshold number of the users. These users may provide respective decryption shares to the requestor in accordance with a threshold decryption technique in response to receiving the encrypted summation sequence. The requestor combines the decryption shares in an effort to decrypt the encrypted summation sequence. For instance, the requestor may be able to decrypt the encrypted summation sequence if at least the threshold number of the users provide their decryption shares. Decrypting the encrypted summation sequence provides a summation of the noisy transformed answer sequences from the users. The requestor transforms this summation back to the original domain to provide an estimate of a summation of the answer sequences of the users. Further detail regarding some example techniques by which a requestor may privately aggregate distributed time-series data, such as encrypted noisy transformed answer sequences from users, are provided below with reference to FIGS. 4 and 5.

Techniques described herein for privately aggregating distributed time-series data have a variety of benefits as compared to conventional techniques for aggregating data. For example, techniques described herein may be capable of ensuring privacy as noise is added to answers and noisy answers are encrypted before sending to the aggregator. The techniques may be capable of enabling requestors to compute useful aggregates over data from individual users while guaranteeing privacy of the data. For instance, the requestors may be untrusted third parties. By using specific Laplace noise, long query sequences over correlated time-series data may be answered in a differentially private way. Differential privacy occurs when statistical information is derived from multiple data entries without revealing information about the individual entries. For instance, an aggregated answer sequence is differentially private if it is insensitive to changes in the data of any single user. The techniques may perturb K coefficients of a transformed answer sequence, thereby improving the accuracy for an N-length query sequence from $\Theta(N)$ to approximately $\Theta(K)$, where K<N, so long as the K coefficients can accurately reconstruct the N query answers. The techniques are capable of adding noise (e.g., Laplace noise) in a distributed way with O(1) complexity per user, as opposed to the O(U) complexity commonly associated with distributed protocols, where U represents the number of users. The techniques may improve accuracy of query answers by orders of magnitude, as compared to conventional aggregation techniques. The techniques are capable of scaling well with a relatively high number of users.

Figure 1:
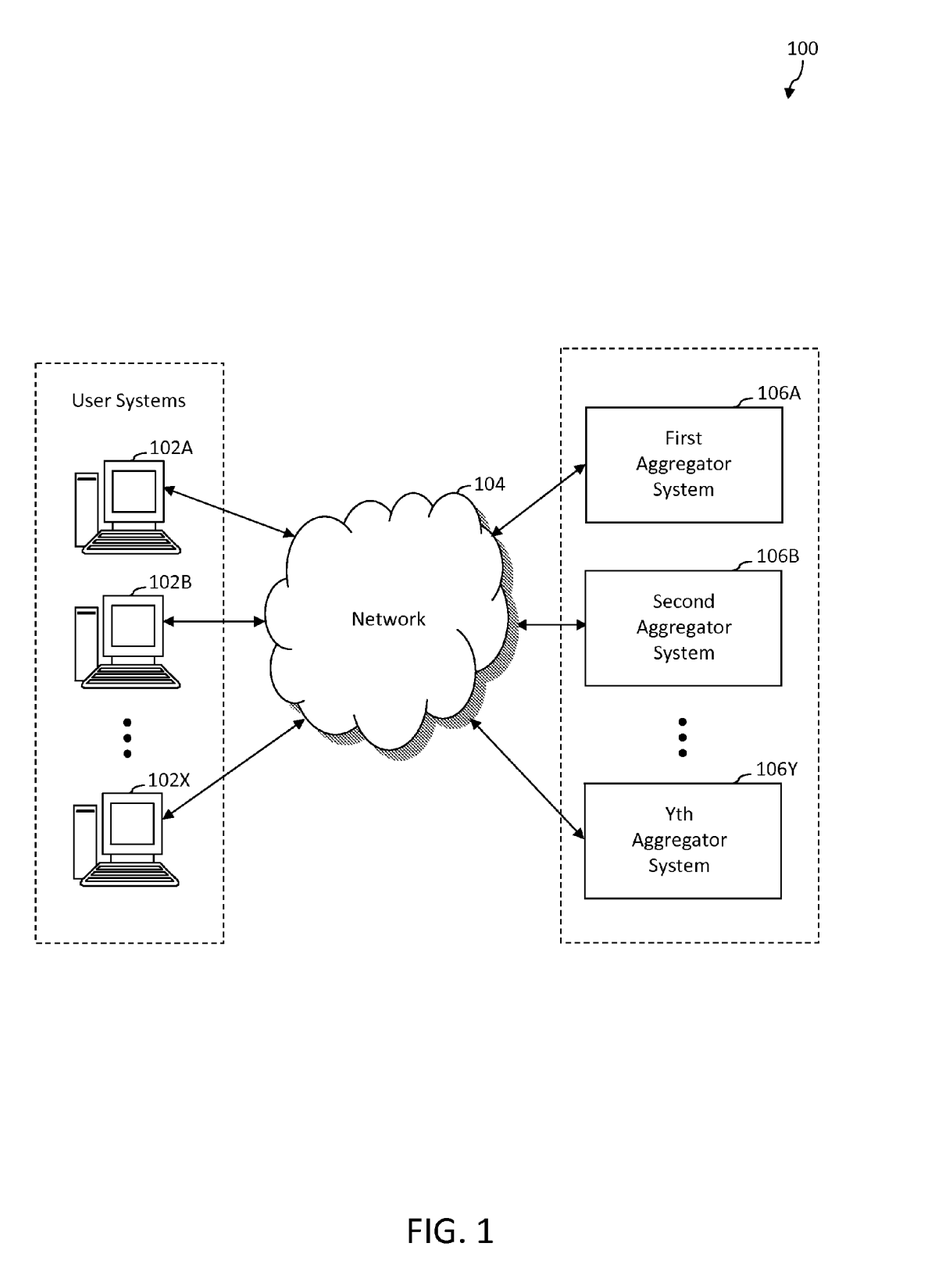
FIG. 1 is a block diagram of an example data mining system in accordance with an embodiment.

FIG. 1 is a block diagram of an example data mining system 100 in accordance with an embodiment. Generally speaking, data mining system 100 operates to mine time-series data of users in order to obtain aggregated answer sequences that correspond to respective query sequences that are provided by requestors (a.k.a. aggregators). For example, in a participatory sensing application (e.g., CarTel™, BikeNet™, Personal Environmental Impact Report™ (PEIR), WeatherUnderground™, etc.), users contribute various time-series data such as their current locations, speeds, weather information, images, etc. These data can be aggregated and mined for community interests (e.g., popular places), congestion patterns on roads, micro-weather, etc.

In another example, a Web browser may install plug-ins to monitor users' browsing behaviors such as the numbers of different types of Web pages the users visit, the types of products the users buy from online stores, etc. Historical data from such plug-ins may be aggregated to understand user behaviors for improving search results and/or for improving targeted advertisement delivery.

In yet another example, health care applications (e.g., Microsoft® HealthVault®, Google® Health, etc.) allow users to periodically upload data such as their weights, occurrences of disease, amounts of exercise, food and drug intake, etc. PEIR allows individual users to store such data locally in personal data vaults. Such data may be mined in combination to understand disease outbreaks, distribution of weights, relationship of weight gain and drug intake, etc.

As shown in FIG. 1, data mining system 100 includes a plurality of user systems 102A-102X, a network 104, and a plurality of aggregator systems 106A-106Y. Communication among user systems 102A-102X and aggregator systems 106A-106Y is carried out over network 104 using well-known network communication protocols. Network 104 may be a wide-area network (e.g., the Internet), a local area network (LAN), another type of network, or a combination thereof.

Aggregator systems 106A-106Y are processing systems that are capable of communicating with user systems 102A-102X. An example of a processing system is a system that includes at least one processor that is capable of manipulating data in accordance with a set of instructions. For instance, a processing system may be a computer, a personal digital assistant, etc. Aggregator systems 106A-106Y are configured to provide query sequences to user systems 102A-102X for requesting time-series data stored on (or otherwise accessible via) user systems 102A-102X. For instance, a requestor may initiate a query sequence for time-series data using a client (e.g., a Web browser, Web crawler, or other type of client) deployed on an aggregator system 106 that is owned by or otherwise accessible to the requestor.

It will be recognized that any one or more aggregator systems 106A-106Y may communicate with any one or more user systems 102A-102X. For instance, an aggregator system 106 may send a query sequence to any one or more user systems 102A-102X for purposes of retrieving time-series data (e.g., encrypted answer sequences) for private aggregation. It will be further recognized that aggregator systems 106A-106Y may include any client-enabled system or device, including but not limited to a laptop computer, a personal digital assistant, a cellular telephone, or the like User systems 102A-102X are processing systems that are capable of communicating with aggregator systems 106A-106Y. User systems 102A-102X are configured to store time-series data. Each of the user systems 102A-102X is further configured to determine answer sequences based on the time-series data in response to receiving query sequences from aggregator systems 106A-106Y. Although user systems 102A-102X are depicted as desktop computers in FIG. 1, persons skilled in the relevant art(s) will appreciate that user systems 102A-102X may include any suitable system or device, including but not limited to a laptop computer, a personal digital assistant, a cellular telephone, a global positioning system (GPS) device, etc. Moreover, the time series data need not necessarily be stored on user systems 102A-102X. For instance, the time series data may be accessible via user systems 102A-102X but stored elsewhere.

Figure 2A:
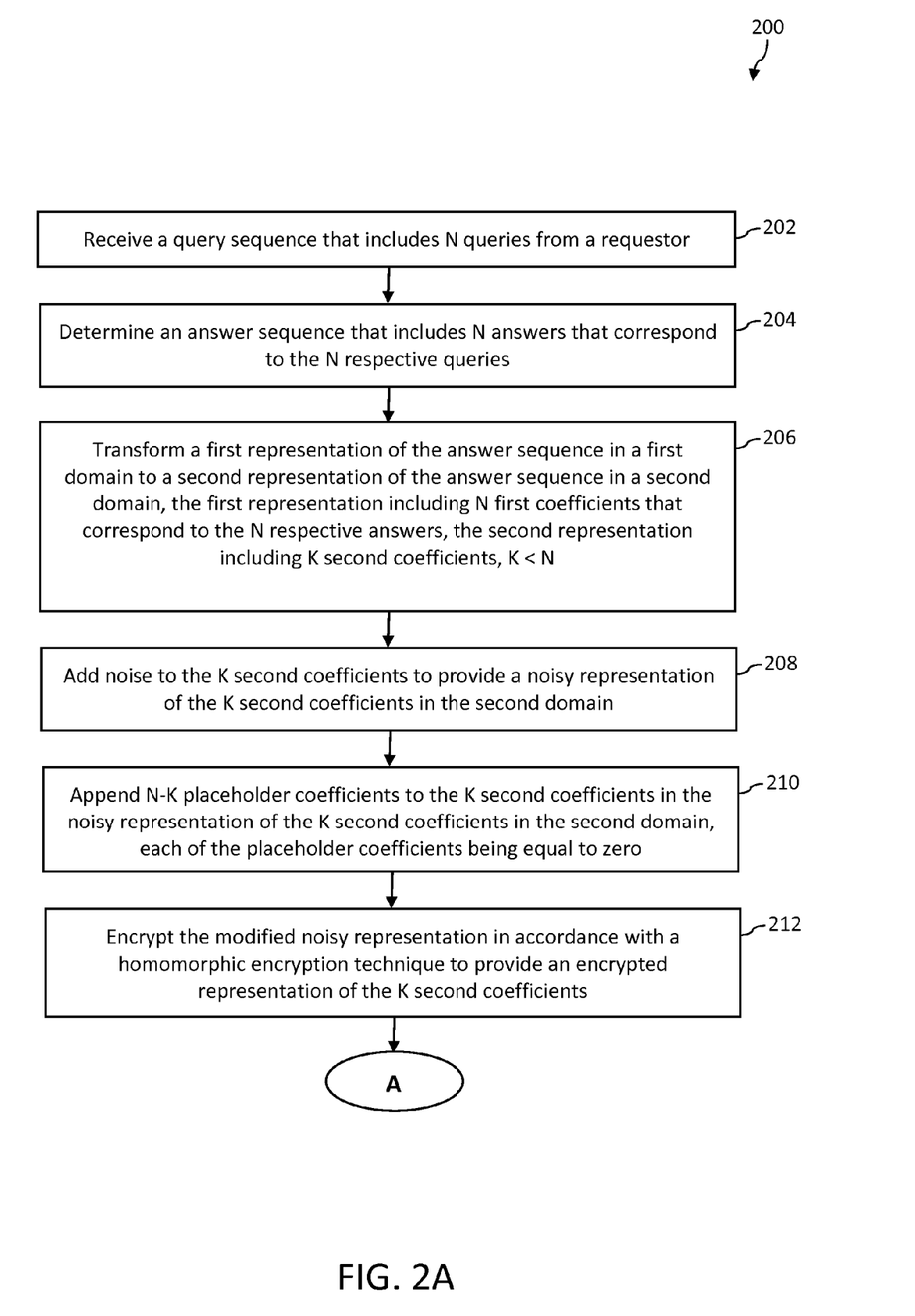
FIGS. 2A-2B depict respective portions of a flowchart of an example method for answering a query sequence in accordance with an embodiment.
Figure 2B:
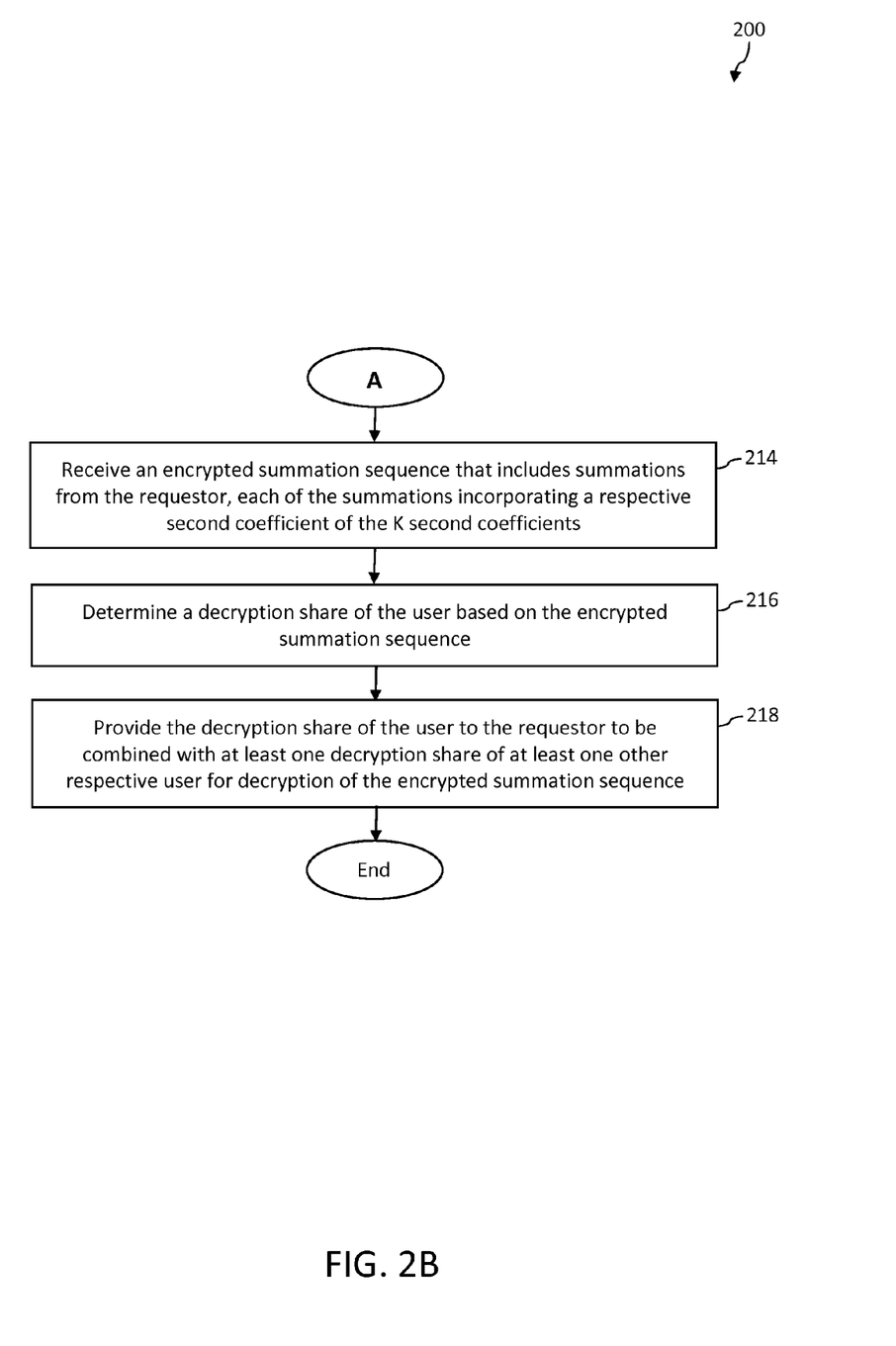
Figure 3:
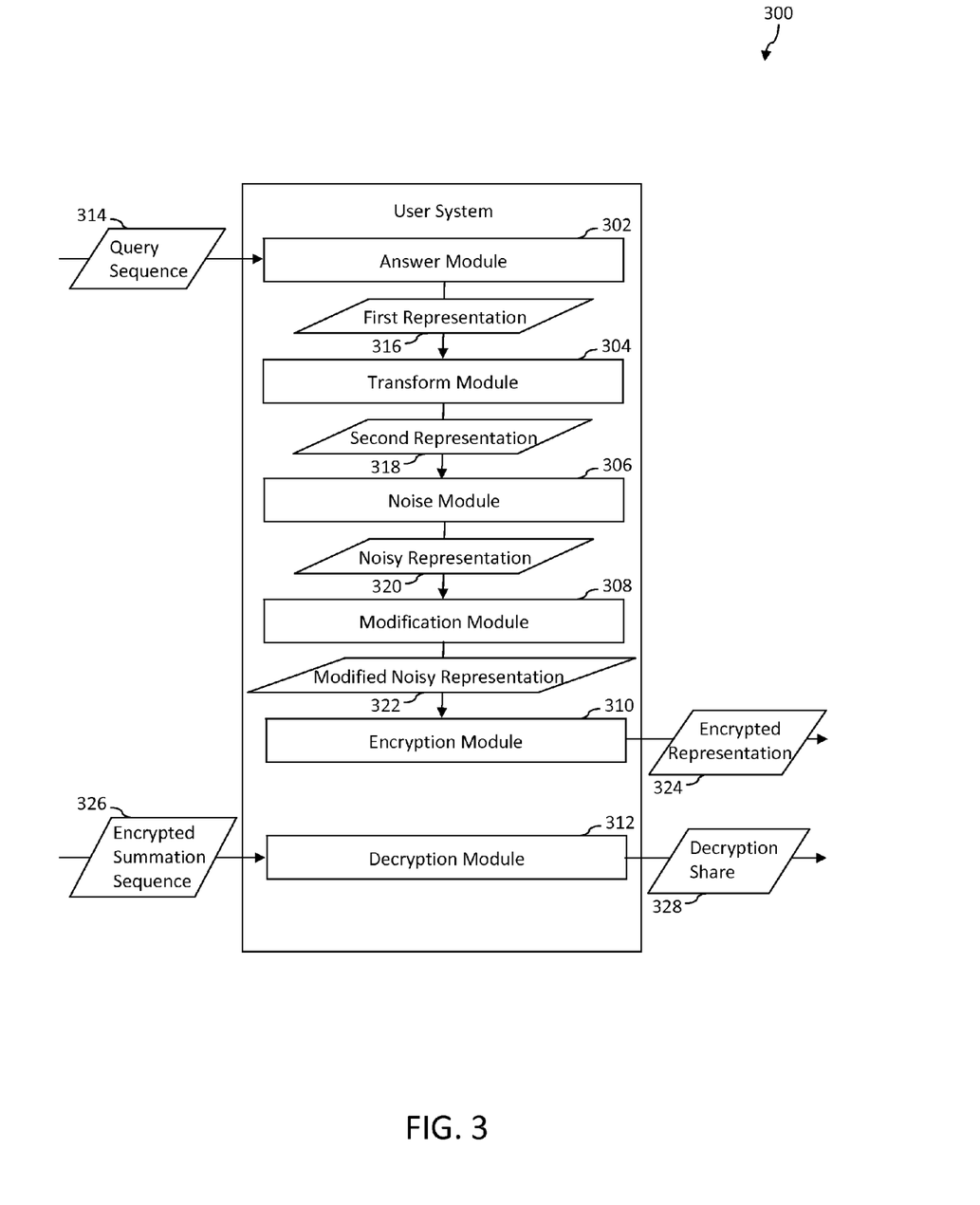
FIG. 3 is a block diagram of an example implementation of a user system shown in FIG. 1 in accordance with embodiments.

FIGS. 2A-2B depict respective portions of a flowchart 200 of an example method for answering a query sequence in accordance with an embodiment. Flowchart 200 is described from the perspective of a user system. Flowchart 200 may be performed by any one or more of user systems 102A-102X of data mining system 100 shown in FIG. 1, for example. For illustrative purposes, flowchart 200 is described with respect to a user system 300 shown in FIG. 3, which is an example of a user system 102, according to an embodiment. As shown in FIG. 3, user system 300 includes an answer module 302, a transform module 304, a noise module 306, a modification module 308, an encryption module 310, and a decryption module 312. Further structural and operational embodiments will be apparent to persons skilled in the relevant art(s) based on the discussion regarding flowchart 200. Flowchart 200 is described as follows.

As shown in FIG. 2, the method of flowchart 200 begins at step 202. In step 202, a query sequence that includes N queries is received from a requestor. For example, the query sequence may be denoted $Q=\{Q_1, \ldots, Q_N\}$, where each $Q_i$ is a snapshot query that returns a single number. The query sequence may be a recurring query, for example, which solicits periodic answers. A recurring query may be historical, meaning that the query focuses on past data, or real-time, meaning that the query runs on data as it becomes available. In an example implementation, answer module 302 receives a query sequence 314 that includes N queries from the requestor.

At step 204, an answer sequence that includes N answers that correspond to the N respective queries is determined. For example, the answer sequence may be denoted $Q(I)=\{Q_1(I), \ldots, Q_N(I)\}$, where each $Q_i(I)$ is an answer of a snapshot query $Q_i$ on input I. For instance, the answer sequence may be in the general form $Q_i(I)=\Sigma_u f_u(I_u)$, where $f_u$ is an arbitrary function that maps user u's data $I_u$ to numbers. Queries that elicit answers in this form are referred to as aggregate-sum queries. In an example implementation, answer module 302 determines the answer sequence.

At step 206, a first representation of the answer sequence in a first domain is transformed to a second representation of the answer sequence in a second domain. The first representation includes N first coefficients that correspond to the N respective answers. The second representation includes K second coefficients. K is less than N. For instance, K may be much less than N. In an example implementation, transform module 304 transforms a first representation 316 of the answer sequence in the first domain to a second representation 318 of the answer sequence in the second domain. First representation 316 includes N first coefficients that correspond to the N respective answers. Second representation 318 includes K second coefficients, and K is less than N. For instance, transform module 304 may receive first representation 316 from answer module 302.

In an example embodiment, the first representation of the answer sequence is transformed in accordance with a discrete Fourier transform technique, and the noisy representation of the plurality of second coefficients is transformed in accordance with an inverse discrete Fourier transform technique. In another example embodiment, the first representation of the answer sequence is transformed in accordance with a discrete cosine transform technique, and the noisy representation of the plurality of second coefficients is transformed in accordance with an inverse discrete cosine transform technique. In yet another example embodiment, the first representation of the answer sequence is transformed in accordance with a discrete wavelet transform technique, and the noisy representation of the plurality of second coefficients is transformed in accordance with an inverse discrete wavelet transform technique.

K may be determined using any of a variety of techniques. Some example techniques for choosing K are described below with respect to a hypothetical scenario. If an inverse-transform were performed on the second representation in the second domain to provide a third representation of the answer sequence in the first domain, the third representation would include a plurality of third coefficients that correspond to the plurality of respective answers. An error of each third coefficient with reference to each respective first coefficient of the first representation of the answer sequence can be denoted $error_i(FPA_K)=K/\in + RE_i^K(Q(I))$ for all $i \in \{1, \ldots, N\}$, where $K/\in$ represents theoretical perturbation error and $RE_i^K(Q(I))$ represents reconstruction error. It should be noted that the actual perturbation error is $\sqrt{N}K/\in$, where the additional factor of $\sqrt{N}$ is included to take into consideration the perturbation error for the entire sequence. If K is too high, the perturbation error becomes too high. If K is too low, the reconstruction error becomes too high. K may be chosen based on assumptions regarding Q(I). For example, if Q(I) is such that the second coefficients of the second representation of the answer sequence decrease exponentially, K may be set at a predetermined fixed value (e.g., 5, 8, 10, etc.), meaning that K is determined before the answer sequence is determined at step 204. In another example, the value of K may be adjusted based on the nature of Q(I).

At step 208, noise is added to the K second coefficients to provide a noisy representation of the K second coefficients in the second domain. For example, the noise may be Laplace noise or any other suitable type of noise. In an example implementation, noise module 306 adds the noise to the K second coefficients to provide a noisy representation 320 of the K second coefficients in the second domain.

In an example embodiment in which the noise is Laplace noise, distribution of the Laplace noise is calibrated to the query sequence. In accordance with this example embodiment, the calibration depends on "sensitivity" of the query sequence. Informally, the sensitivity of the query sequence represents the maximum amount the query answers can change given any change to a single user's data $I_u$. If Q is a query sequence, Q(I) and Q(I') are each vectors. Sensitivity measures the distance between the two vectors. For example, the sensitivity may be determined using the $L_1$ distance metric, denoted $|Q(I)-Q(I')|_1$, which measures the Manhattan distance $\Sigma_i |Q_i(I)-Q_i(I')|$ between these vectors. In another example, the sensitivity may be determined using the $L_2$ distance metric, denoted $|Q(I)-Q(I')|_2$, which measures the Euclidean distance $\sqrt{\Sigma_i(Q_i(I)-Q_i(I'))^2}$ between the vectors. In yet another example, the sensitivity may be determined using both the $L_1$ distance metric and the $L_2$ distance metric.

For $p \in \{1,2\}$, the $L_p$ sensitivity of Q, denoted $\Delta_p(Q)$, may be defined as the smallest number such that for all I and $I' \in Nbrs(I)$, $|Q(I)-Q(I')|_p \leq \Delta_p(Q)$. Note that for a single snapshot query $Q_i$, the $L_1$ and $L_2$ sensitivities are the same, such that $\Delta(Q_i)=\Delta_1(Q_i)=\Delta_2(Q_i)$.

In another example embodiment, independent Laplace noise is added to each of the second coefficients. Independent Laplace noise is Laplace noise that is to be added to a designated second coefficient, rather than to the second coefficients as a whole. In accordance with this example embodiment, the independent Laplace noise $Lap(\lambda)$ for each second coefficient is a random variable drawn from a Laplace distribution having a probability distribution function $$Pr(Lap(\lambda)=Z)=\frac{1}{2\lambda}e^{-\in|Z|/\lambda}.$$

The independent Laplace noise $Lap(\lambda)$ for each second coefficient has a mean equal to zero and a variable equal to $2\lambda^2$. The instances of independent Laplace noise that are added to the respective second coefficients may be represented collectively as a vector $Lap^K(\lambda)$ having K independent $Lap(\lambda)$ random variables.

At step 210, N-K placeholder coefficients are appended to the K second coefficients in the noisy representation of the K second coefficients to provide a modified noisy representation of the K second coefficients in the second domain. Each of the placeholder coefficients is equal to zero. In an example implementation, modification module 308 appends the N-K placeholder coefficients to the K second coefficients in noisy representation 320 of the K second coefficients to provide a modified noisy representation 322 of the K second coefficients in the second domain.

At step 212, the modified noisy representation is encrypted in accordance with a homomorphic encryption technique to provide an encrypted representation of the K second coefficients to the requestor. In an example implementation, encryption module 310 encrypts noisy representation 320 to provide an encrypted representation 324 of the K second coefficients to the requestor. Upon completion of step 212, flow continues at step 214, which is shown in FIG. 2B.

At step 214, an encrypted summation sequence that includes summations is received from the requestor. Each of the summations incorporates a respective second coefficient of the K second coefficients. In an example implementation, decryption module 312 receives an encrypted summation sequence 326 that includes the summations from the requestor.

At step 216, a decryption share of the user is determined based on the encrypted summation sequence. In an example implementation, decryption module 312 determines a decryption share 328 of the user based on encrypted summation sequence 326.

At step 218, the decryption share of the user is provided to the requestor to be combined with at least one other decryption share of at least one other respective user for decryption of the encrypted summation sequence. In an example implementation, decryption module 312 provides decryption share 328 of the user to the requestor to be combined with at least one decryption share of at least one other respective user for decryption of encrypted summation sequence 326.

In an example embodiment, the noise that is added to the K second coefficients at step 208 is Laplace noise that is generated using four Gaussian variables. For example, a Gaussian random variable with mean $\mu$ and variance $\sigma^2$ may be denoted $N(\mu, \sigma)$. Let $Y_i \sim N(0, \lambda)$ for $i \in \{1,2,3,4\}$ be the four Gaussian variables. Then $Z=Y_1^2+Y_2^2-Y_3^2-Y_4^2$ is a $Lap(2\lambda^2)$ random variable. Two randomly generated private keys $a_u, b_u \in Z_m$ are generated for each user u who contributes to the encrypted summation sequence. The keys $b_u$ are such that their sum for all users $\Sigma E_{u=1}^U b_u$ is zero. Denote "a" the sum $\Sigma_{u=1}^U a_u$. $Enc(a^2)$ is computed and made public in a key generation phase. For example, the keys $a_u$, $b_u$ may be generated once using an expensive secret sharing protocol or other technique.

For instance, each user u who contributes to the encrypted summation sequence may compute $c_u=Enc(y_u+a_u+b_u)$ and send it to the requestor. Once the requestor computes $c=\Pi_{u=1}^U c_u$ and sends it to each user u, each user u generates a random $r_u \in Z_m$, computes $c_u=c^{y_c-a_u+b_u}Enc(r_u)$, so that the requestor can compute $c'=(\Pi_{u=1}^U c_u)Enc(a^2)$ based on the $c_u$ from each user u.

In another example embodiment, differential privacy is guaranteed if the parameter $\lambda$ of the Laplace noise that is described with reference to step 208 is calibrated according to the $L_1$ sensitivity of the query sequence Q. For instance, the parameter $\lambda$ may be set equal to $\Delta_1(Q)/\in$ to satisfy e-differential privacy. The second representation of the answer sequence may be denoted $F^K$. The $L_1$ sensitivity of the second representation $F^K$ is at most $\sqrt{K}$ times the $L_2$ sensitivity of the query sequence Q. Accordingly, the parameter $\lambda$ may be set equal to $\sqrt{K}\Delta_2(Q)/\in$ to satisfy e-differential privacy. In an example, the Laplace noise added by the user alone may not be sufficient to satisfy differential privacy. In accordance with this example, the cumulative noise shares that are provided by respective users who contribute to the encrypted summation sequence may be sufficient to satisfy differential privacy.

In some example embodiments, one or more steps 202, 204, 206, 208, 210, 212, 214, 216, and/or 218 of flowchart 200 may not be performed. Moreover, steps in addition to or in lieu of steps 202, 204, 206, 208, 210, 212, 214, 216, and/or 218 may be performed. For example, if step 210 not performed, the modified noisy representation of step 210 is not encrypted at step 212. In accordance with this example, the noisy representation that is provided at step 208 may be encrypted at step 212 using the homomorphic encryption technique to provide the encrypted representation of the K second coefficients.

It will be recognized that user system 300 may not include one or more of answer module 302, transform module 304, noise module 306, modification module 308, encryption module 310, and/or decryption module 312. Furthermore, user system 300 may include modules in addition to or in lieu of answer module 302, transform module 304, noise module 306, modification module 308, encryption module 310, and/or decryption module 312.

Figure 4:
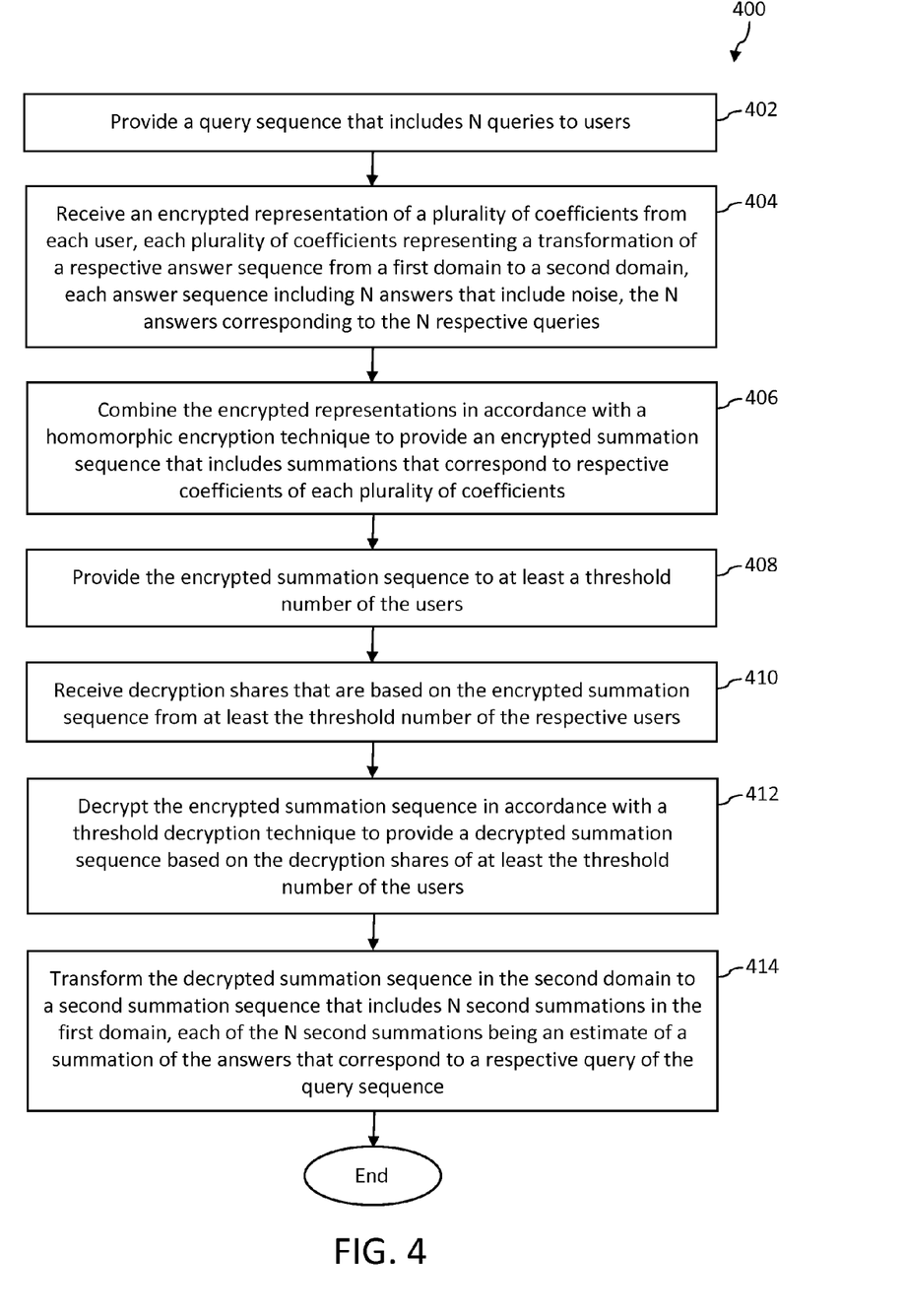
FIG. 4 depicts a flowchart of an example method for privately aggregating distributed time-series data in accordance with an embodiment.
Figure 5:
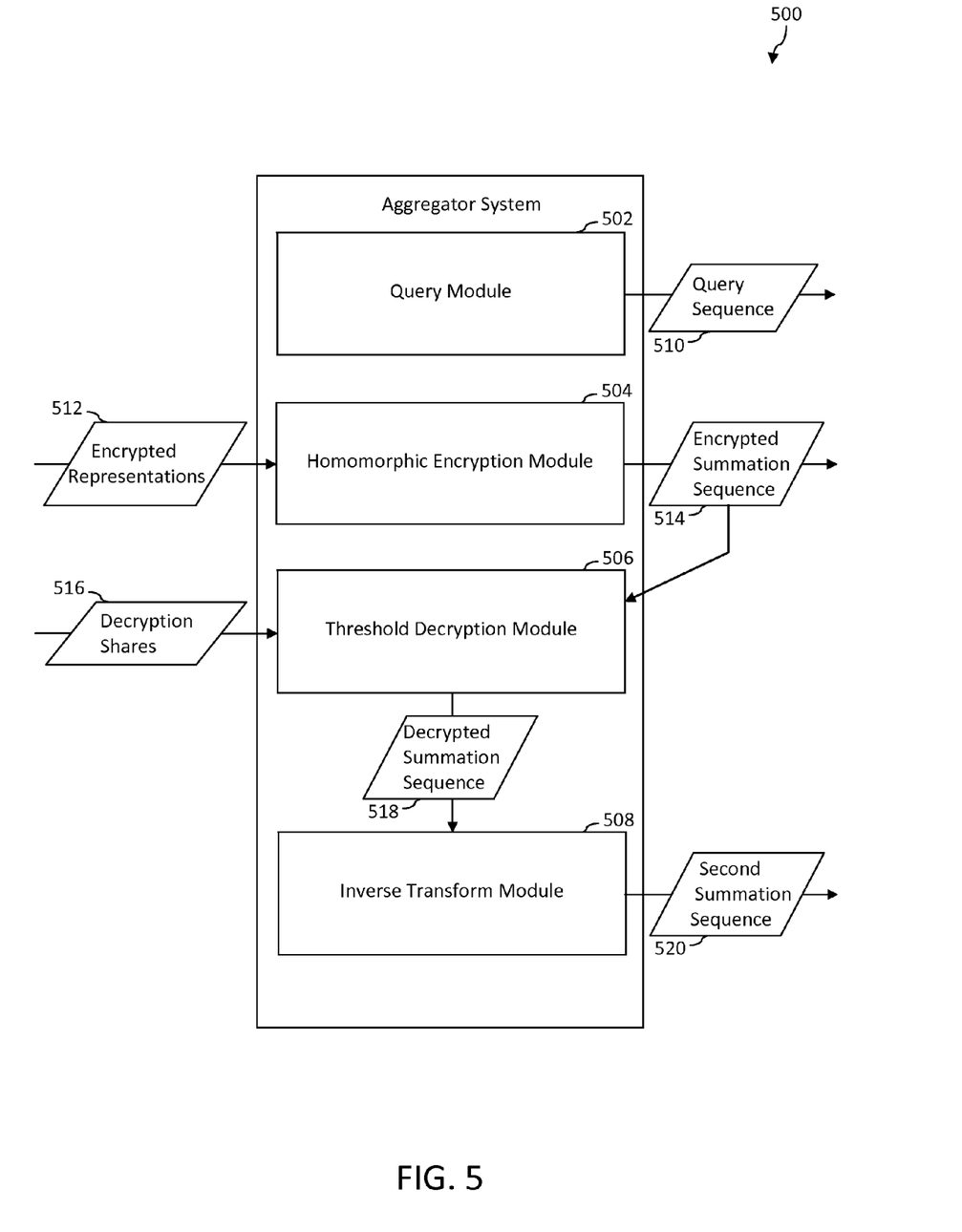
FIG. 5 is a block diagram of an example implementation of an aggregator system shown in FIG. 1 in accordance with embodiments.

FIG. 4 depicts a flowchart 400 of an example method for privately aggregating distributed time-series data in accordance with an embodiment. Flowchart 400 is described from the perspective of an aggregator system. Flowchart 400 may be performed by any one or more of aggregator systems 106A-106Y of data mining system 100 shown in FIG. 1, for example. For illustrative purposes, flowchart 400 is described with respect to an aggregator system 500 shown in FIG. 5, which is an example of an aggregator system 106, according to an embodiment. As shown in FIG. 5, aggregator system 500 includes a query module 502, a homomorphic encryption module 504, a threshold decryption module 506, and an inverse transform module 508. Further structural and operational embodiments will be apparent to persons skilled in the relevant art(s) based on the discussion regarding flowchart 400. Flowchart 400 is described as follows.

As shown in FIG. 4, the method of flowchart 400 begins at step 402. In step 402, a query sequence that includes N queries is provided to users. For example, the query sequence may be a historical recurring query. In another example, the query sequence may be a real-time recurring query. In an example implementation, query module 502 provides query sequence 510 that includes N queries to the users.

At step 404, an encrypted representation of a plurality of coefficients is received from each user. Each plurality of coefficients represents a transformation of a respective answer sequence from a first domain to a second domain. Each answer sequence includes N answers that include noise. For example, the noise may be Laplace noise or any other suitable type of noise. The N answers correspond to the N respective queries. In an example implementation, homomorphic encryption module 504 receives encrypted representations 512 from the respective users. Each of the encrypted representations 512 represents a transformation of a respective answer sequence from the first domain to the second domain.

At step 406, the encrypted representations are combined in accordance with a homomorphic encryption technique to provide an encrypted summation sequence that includes summations that correspond to respective coefficients of each plurality of coefficients. In an example implementation, homomorphic encryption module 504 combines the encrypted representations 512 in accordance with the homomorphic encryption technique to provide encrypted summation sequence 514 that includes the summations.

At step 408, the encrypted summation sequence is provided to at least a threshold number of the users. In an example implementation, homomorphic encryption module 504 provides encrypted summation sequence 514 to at least the threshold number of the users.

At step 410, decryption shares that are based on the encrypted summation sequence are received from at least the threshold number of the respective users. In an example implementation, threshold decryption module 506 receives decryption shares 516 that are based on encrypted summation sequence 514 from at least the threshold number of the respective users.

At step 412, the encrypted summation sequence is decrypted in accordance with a threshold decryption technique to provide a decrypted summation sequence based on the decryption shares of at least the threshold number of the users. In an example implementation, threshold decryption module 506 decrypts encrypted summation sequence 514 in accordance with the threshold decryption technique to provide decrypted summation sequence 518 based on the decrypted shares of at least the threshold number of the users. For instance, threshold decryption module 506 may receive encrypted summation sequence 514 from homomorphic encryption module 504 for purposes of decryption.

At step 414, the decrypted summation sequence in the second domain is transformed to a second summation sequence that includes N second summations in the first domain. Each of the N second summations is an estimate of a summation of the answers that correspond to a respective query of the query sequence. In an example implementation, inverse transform module 508 transforms decrypted summation sequence 518 in the second domain to second summation sequence 520 that includes the N second summations in the first domain.

In an example embodiment, the second summation sequence is a differentially private summation sequence. A summation sequence is differentially private if it is insensitive to changes in the data $I_u$ of any single user u. This provides privacy because if similar stores (e.g., databases), for example differing in the data of one user, produce indistinguishable outputs, then an adversary cannot use the output to infer any single user's data. To formalize this notion, denote Nbrs(I) the data obtained from adding/removing one user's data from the combined data I from U users. Nbrs(I) includes I' such that $I'=I \cup I_u$ for $u \notin \{1, \ldots, U\}$ or $I'=I-I_u$ for some $u \in \{1, \ldots, U\}$.

In accordance with this example embodiment, an algorithm A may be performed on data I. The output of the algorithm may be denoted A(I). The algorithm A is said to be e-differentially private if all I, I' such that I'∈Nbrs(I), and any output X, the following holds: $Pr[A(I)=X] \leq e^\epsilon Pr[A(I')=X]$, where Pr is a probability distribution over the randomness of the algorithm.

Some example embodiments are capable of providing differential privacy even if the requestor and/or one or more of the users are malicious. For example, a malicious user may be a liar or a breaker. A liar is a user who lies about the user's answers, but otherwise follows a protocol correctly (e.g., sends proper messages). A breaker is a user who breaks the protocol (e.g., sends wrong messages). A malicious requestor may break the protocol and/or collude with malicious users.

To ensure privacy for users, an assumption may be made that at least a portion (e.g., a majority) of the users are honest. A lower bound H of the number of honest users may be known a priori when noise generation parameters are decided. Remaining users and the requestor can be arbitrarily malicious. A user need not necessarily trust any other user or the requestor. For instance, knowing that at least a certain portion of the other users are honest may be sufficient for the user to assume that true values of the user's answers will remain private.

On the other hand, it may be assumed that the requestor queries a set of users that the requestor generally trusts in order for the answers of the users to be useful. In accordance with this assumption, of the users the requestor chooses to query, there are at most L liars, and the remaining users are either honest or colluding/collaborating with the requestor. It may not be possible to ensure utility of answers if a relatively high number of users lie about their data. The same may be true if even a single user introduces an arbitrarily large noise. Accordingly, it may be assumed that there are no breakers. In practice, this can be arranged by ensuring that users' messages sent to the requestor are generated and digitally signed by trusted software implementing the protocol.

A privacy guarantee may hold even if a large number of users are malicious. This may be crucial to make new privacy-aware users feel comfortable to share their answers. For instance, a utility guarantee may hold even if a relatively low number (e.g., fewer than L) of users lie and try to disrupt the summation sequence that includes the aggregated answers. This leaves the responsibility to the requestor for choosing a good set of users to query. For example, if the requestor can identify a malicious user (e.g., via some out-of-band mechanism), the requestor can blacklist the user and exclude the user from its queries.

In accordance with an example embodiment, step 406 and 412 are performed in accordance with a Paillier cryptosystem technique. A Paillier cryptosystem technique is a technique in which an integer m is chosen such that (i) m=pq where p and q are strong primes (i.e., p=2p'+1 and q=2q'+1), and (ii) gcd(m, Φ(m))=1. It will be recognized that gcd(m, Φ(m)) represents the greatest common divisor of m and Φ(m). Once m is chosen, any number in Zm (the set $\{0, 1, \ldots, m-1\}$) can be encrypted. The subset of numbers in Zm that have a multiplicative inverse modulo m (e.g., 0 does not have an inverse, but 1 has an inverse) is denoted $Z_m^*$. A random element $\beta \in Z_m^*$ is chosen, and the private key λ is set equal to 1 cm(p, q). It will be recognized that 1 cm(p, q) represents the least common multiple of p and q. A parameter g is set equal to $(1+m)^a b^m \mod m^2$ for some randomly chosen $(a, b) \in Z_m^* \times Z_m^*$.

The triplet (m, g, $g^\lambda$) forms the public key. The encryption function Enc maps a plaintext message $t \in Z_m$ to ciphertext $c \in Z_{m^2}^*$. Enc(t) is computed as $g^t r^m \mod m^2$ where $r \in Z_m^*$ is a randomly chosen number. Denote L the function L(u)=(u−1)/m for any u=1 mod m. The decryption of ciphertext $c \in Z_{m^2}^*$ is the function $$Dec(c) = \frac{L(c^\lambda \mod m^2)}{L(g^\lambda \mod m^2)}.$$

If $c_i$ is a ciphertext for message $t_i$ for i∈1,2, then $c_1 \cdot c_2$ is a ciphertext for message $t_1+t_2$. Suppose the private key λ is shared by U users as $\lambda = \Sigma_u \lambda_u$ where $\lambda_u$ is the private key for user u. Then decryption of a ciphertext c can be performed distributedly (e.g., without any party knowing). For example, each user u computes a respective decryption share $c_u = c^{\lambda_u}$. The decryption shares are combined as $c' = \Pi_{u=1}^{U} c_u$. Finally, the decryption $$t = \frac{L(c' \bmod m^2)}{L(g^\lambda \bmod m^2)}$$

is computed.

In some example embodiments, one or more steps 402, 404, 406, 408, 410, 412, and/or 414 of flowchart 400 may not be performed. Moreover, steps in addition to or in lieu of steps 402, 404, 406, 408, 410, 412, and/or 414 may be performed.

It will be recognized that aggregator system 500 may not include one or more of query module 502, homomorphic encryption module 504, threshold decryption module 506, and/or inverse transform module 508. Furthermore, aggregator system 500 may include modules in addition to or in lieu of query module 502, homomorphic encryption module 504, threshold decryption module 506, and/or inverse transform module 508.

Answer module 302, transform module 304, noise module 306, modification module 308, encryption module 310, decryption module 312, query module 502, homomorphic encryption module 504, threshold decryption module 506, and inverse transform module 508 may be implemented in hardware, software, firmware, or any combination thereof. For example, answer module 302, transform module 304, noise module 306, modification module 308, encryption module 310, decryption module 312, query module 502, homomorphic encryption module 504, threshold decryption module 506, and/or inverse transform module 508 may be implemented as computer program code configured to be executed in one or more processors. In another example, answer module 302, transform module 304, noise module 306, modification module 308, encryption module 310, decryption module 312, query module 502, homomorphic encryption module 504, threshold decryption module 506, and/or inverse transform module 508 may be implemented as hardware logic/electrical circuitry.

Figure 6:
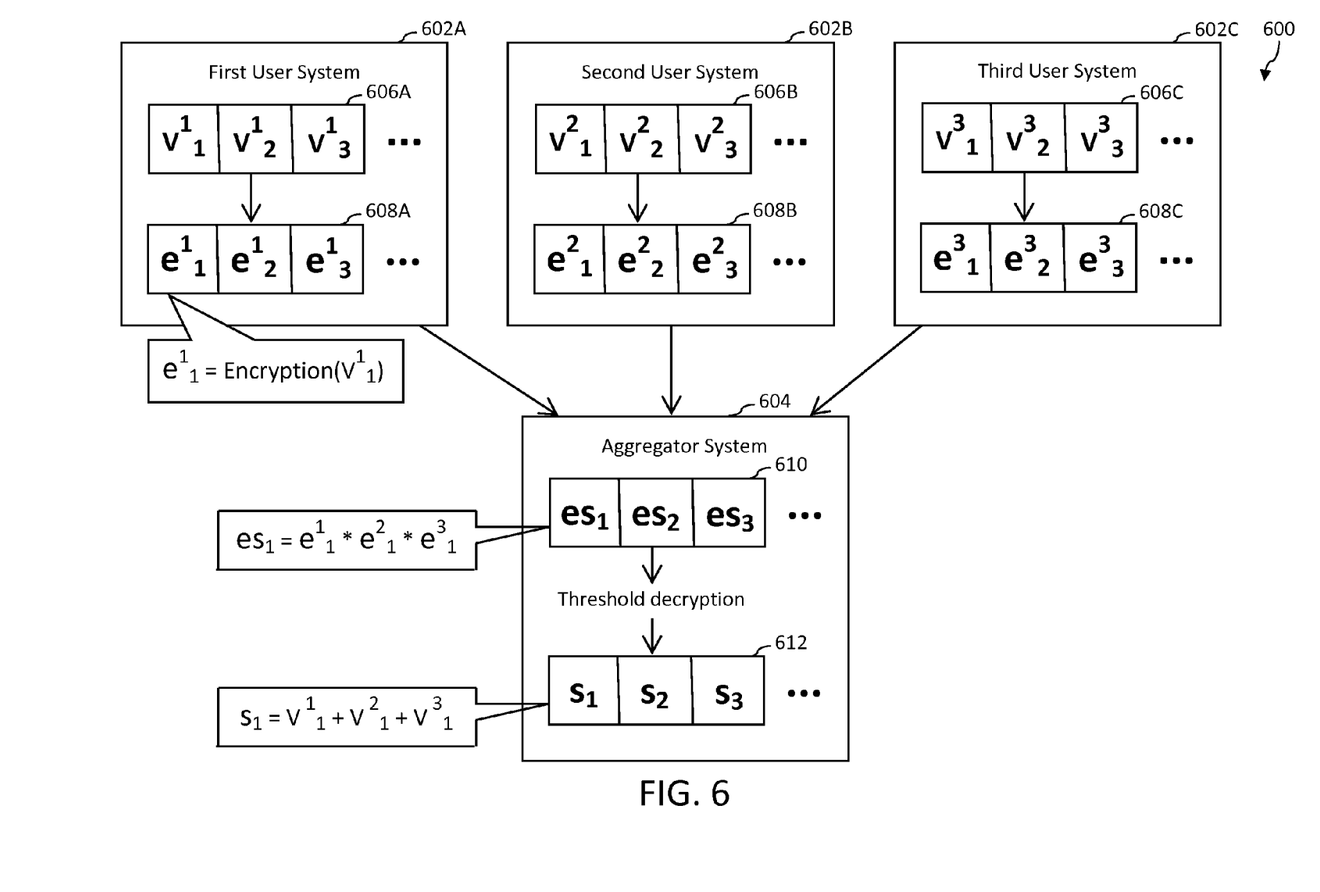
FIG. 6 is a block diagram of another example data mining system in accordance with an embodiment.

FIG. 6 is a block diagram of another example data mining system 600 in accordance with an embodiment. As shown in FIG. 6, data mining system 600 includes a first user system 602A, a second user system 602B, a third user system 602C, and an aggregator system 604. Communication among user systems 602A-602C and aggregator system 606 is carried out using well-known network communication protocols.

User systems 602A-602C are processing systems that are capable of communicating with aggregator system 604. User system 602A-602C are configured to generate respective transformed answer sequences 606A-606C in response to a query sequence that is received from aggregator system 604. Transformed answer sequence 606A includes items $v^1_1$, $v^1_2$, $v^1_3$, and so on; transformed answer sequence 606B includes items $v^2_1$, $v^2_2$, $v^2_3$, and so on; and transformed answer sequence 606C includes items $v^3_1$, $v^3_2$, $v^3_3$, and so on.

User systems 602A-602C are further configured to encrypt the respective transformed answer sequences 606A-606C in accordance with a homomorphic encryption technique to provide respective encrypted representations 608A-608C for further processing by aggregator system 604. Encrypted representation 606A includes items $e^1_1$, $e^1_2$, $e^1_3$, and so on; encrypted representation 606B includes items $e^2_1$, $e^2_2$, $e^2_3$, and so on; and encrypted representation 606C includes items $e^3_1$, $e^3_2$, $e^3_3$, and so on. The items in each of the transformed answer sequences 606A-606C are encrypted independently to provide the respective items in the encrypted representations 608A-608C. For instance, item $v^1_1$ is encrypted to provide item $e^1_1$; item $v^1_2$ is encrypted to provide item $e^1_2$; item $v^1 3$ is encrypted to provide item $e^1_3$, and so on.

Aggregator system 604 is a processing system that is capable of communicating with user systems 602A-602C. Aggregator system 604 is configured to combine the encrypted representations 608A-608C that are received from respective user systems 602A-602C to provide encrypted summation sequence 610.

Encrypted summation sequence 610 includes items $es_1$, $es_2$, $es_3$, and so on. Each item in the encrypted summation sequence 610 is a product of respective items in the encrypted representations 608A-608C. For instance, item $es_t$ may be defined by the equation $es_1 = e^1_1 * e^2_1 * e^3_1$; item $es_2$ may be defined by the equation $es_2 = e^1_2 * e^2_2 * e^3_2$; item $es_3$ may be defined by the equation $es_3 = e^1_3 * e^2_3 * e^3_3$, and so on.

Aggregator system 604 is further configured to decrypt encrypted summation sequence 610 in accordance with a threshold decryption technique to provide decrypted summation sequence 612. Decrypted summation sequence 612 includes items $s_1$, $s_2$, $s_3$, and so on. Each item in the decrypted summation sequence 612 is a sum of respective items in the transformed answer sequences 606A-606C. For instance, item $s_1$ may be defined by the equation $s_1 = v^1_1 + v^2_1 + v^3_1$; item $s_2$ may be defined by the equation $s_2 = v^1_2 + v^2_2 + v^3_2$; item $s_3$ may be defined by the equation $s_3 = v^1_3 + v^2_3 + v^3_3$, and so on. Accordingly, item-wise multiplication of encrypted items from the encrypted representations 608A-608C is performed to ultimately obtain item-wise summation of items from the transformed answer sequences 606A-606C.

Three user systems 602A-602C are shown in FIG. 6 for ease of discussion and are not intended to be limiting. It will be recognized that data mining system 600 may include any suitable number of user systems.

Figure 7:
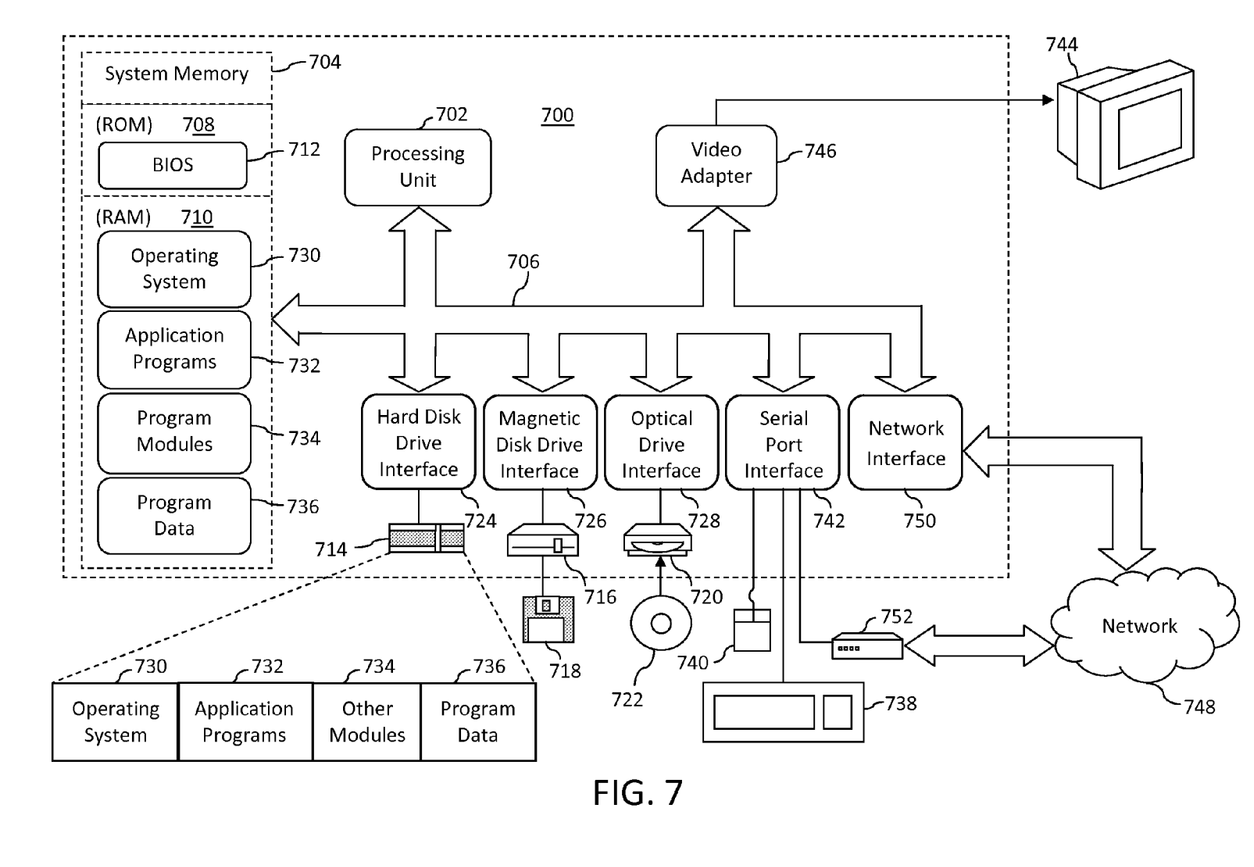
FIG. 7 depicts an example computer in which embodiments may be implemented.

FIG. 7 depicts an example computer 700 in which embodiments may be implemented. Any one or more of the user systems 102A-102X or the aggregator systems 106A-106Y shown in FIG. 1 (or any one or more subcomponents thereof shown in FIGS. 3 and 5) may be implemented using computer 700, including one or more features of computer 700 and/or alternative features. Computer 700 may be a general-purpose computing device in the form of a conventional personal computer, a mobile computer, or a workstation, for example, or computer 700 may be a special purpose computing device. The description of computer 700 provided herein is provided for purposes of illustration, and is not intended to be limiting. Embodiments may be implemented in further types of computer systems, as would be known to persons skilled in the relevant art(s).

As shown in FIG. 7, computer 700 includes a processing unit 702, a system memory 704, and a bus 706 that couples various system components including system memory 704 to processing unit 702. Bus 706 represents one or more of any of several types of bus structures, including a memory bus or memory controller, a peripheral bus, an accelerated graphics port, and a processor or local bus using any of a variety of bus architectures. System memory 704 includes read only memory (ROM) 708 and random access memory (RAM) 710. A basic input/output system 712 (BIOS) is stored in ROM 708.

Computer 700 also has one or more of the following drives: a hard disk drive 714 for reading from and writing to a hard disk, a magnetic disk drive 716 for reading from or writing to a removable magnetic disk 718, and an optical disk drive 720 for reading from or writing to a removable optical disk 722 such as a CD ROM, DVD ROM, or other optical media. Hard disk drive 714, magnetic disk drive 716, and optical disk drive 720 are connected to bus 706 by a hard disk drive interface 724, a magnetic disk drive interface 726, and an optical drive interface 728, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 730, one or more application programs 732, other program modules 734, and program data 736. Application programs 732 or program modules 734 may include, for example, computer program logic for implementing answer module 302, transform module 304, noise module 306, modification module 308, encryption module 310, decryption module 312, query module 502, homomorphic encryption module 504, threshold decryption module 506, inverse transform module 508, flowchart 200 (including any step of flowchart 200), and/or flowchart 400 (including any step of flowchart 400), as described herein.

A user may enter commands and information into the computer 700 through input devices such as keyboard 738 and pointing device 740. Other input devices (not shown) may include a microphone, joystick, game pad, satellite dish, scanner, or the like. These and other input devices are often connected to the processing unit 702 through a serial port interface 742 that is coupled to bus 706, but may be connected by other interfaces, such as a parallel port, game port, or a universal serial bus (USB).

A display device 744 (e.g., a monitor) is also connected to bus 706 via an interface, such as a video adapter 746. In addition to display device 744, computer 700 may include other peripheral output devices (not shown) such as speakers and printers.

Computer 700 is connected to a network 748 (e.g., the Internet) through a network interface or adapter 750, a modem 752, or other means for establishing communications over the network. Modem 752, which may be internal or external, is connected to bus 706 via serial port interface 742.

As used herein, the terms "computer program medium" and "computer-readable medium" are used to generally refer to media such as the hard disk associated with hard disk drive 714, removable magnetic disk 718, removable optical disk 722, as well as other media such as flash memory cards, digital video disks, random access memories (RAMs), read only memories (ROM), and the like.

As noted above, computer programs and modules (including application programs 732 and other program modules 734) may be stored on the hard disk, magnetic disk, optical disk, ROM, or RAM. Such computer programs may also be received via network interface 750 or serial port interface 742. Such computer programs, when executed or loaded by an application, enable computer 700 to implement features of embodiments discussed herein. Accordingly, such computer programs represent controllers of the computer 700.

Example embodiments are also directed to computer program products comprising software (e.g., computer-readable instructions) stored on any computer useable medium. Such software, when executed in one or more data processing devices, causes a data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

III. Conclusion

While various embodiments have been described above, it should be understood that they have been presented by way of example only, and not limitation. It will be apparent to persons skilled in the relevant art(s) that various changes in form and details can be made therein without departing from the spirit and scope of the invention. Thus, the breadth and scope of the present invention should not be limited by any of the above-described example embodiments, but should be defined only in accordance with the following claims and their equivalents.

What is claimed is:

1. A method comprising:
receiving a query sequence that includes a plurality of queries at a user computing device from a requestor;
determining an answer sequence that includes a plurality of answers that corresponds to the plurality of respective queries;
transforming a first representation of the answer sequence in a first domain to a second representation of the answer sequence in a second domain, the first representation including a plurality of first coefficients that corresponds to the plurality of respective answers, the second representation including a plurality of second coefficients, a number of the second coefficients in the plurality of second coefficients being less than a number of the first coefficients in the plurality of first coefficients;
adding noise to the plurality of second coefficients to provide a noisy representation of the plurality of second coefficients in the second domain;
encrypting the noisy representation in accordance with a homomorphic encryption technique to provide an encrypted representation of the plurality of second coefficients to the requestor;
receiving an encrypted summation sequence that includes a plurality of summations from the requestor, each of the plurality of summations incorporating a respective second coefficient of the noisy representation of the plurality of second coefficients;
determining a decryption share of the user based on the encrypted summation sequence; and
providing the decryption share of the user to the requestor to be combined with at least one decryption share of at least one other respective user for decryption of the encrypted summation sequence.

2. The method of claim 1, wherein transforming the first representation of the answer sequence comprises:
transforming the first representation of the answer sequence in accordance with a discrete Fourier transform technique.

3. The method of claim 1, wherein transforming the first representation of the answer sequence comprises:
transforming the first representation of the answer sequence in accordance with a discrete cosine transform technique.

4. The method of claim 1, wherein transforming the first representation of the answer sequence comprises:
   transforming the first representation of the answer sequence in accordance with a discrete wavelet transform technique.

5. The method of claim 1, further comprising:
   generating the noise to be Laplace noise using four Gaussian variables.

6. The method of claim 1, wherein adding noise to the plurality of second coefficients comprises:
   adding independent Laplace noise to each of the second coefficients to provide the noisy representation of the plurality of second coefficients in the second domain.

7. The method of claim 1, wherein adding noise to the plurality of second coefficients comprises:
   adding noise to the plurality of second coefficients, which includes a predetermined number of second coefficients, to provide the noisy representation of the plurality of second coefficients in the second domain.

8. The method of claim 1, further comprising:
   determining the number of second coefficients to be included in the plurality of second coefficients based on a reconstruction error and a perturbation error that are associated with that number.

9. The method of claim 1, further comprising:
   appending a designated number of placeholder coefficients to the plurality of second coefficients in the noisy representation of the plurality of second coefficients, each of the placeholder coefficients being equal to zero;
   wherein the designated number is equal to the number of the first coefficients in the plurality of first coefficients minus the number of the second coefficients in the plurality of second coefficients.

10. A method comprising:
    providing a query sequence that includes a plurality of queries to a plurality of users that is associated with one or more user computing devices;
    receiving an encrypted representation of a plurality of coefficients from each of the plurality of users in response to providing the query sequence, each plurality of coefficients representing a transformation of a respective answer sequence from a first domain to a second domain, each answer sequence including a plurality of answers that include noise, each plurality of answers corresponding to the plurality of respective queries;
    combining the encrypted representations in accordance with a homomorphic encryption technique to provide an encrypted summation sequence that includes a plurality of summations that correspond to respective coefficients of each plurality of coefficients;
    providing the encrypted summation sequence to at least a threshold number of the users;
    receiving decryption shares that are based on the encrypted summation sequence from at least the threshold number of the respective users;
    decrypting the encrypted summation sequence in accordance with a threshold decryption technique to provide a decrypted summation sequence based on the decryption shares of at least the threshold number of the users; and
    transforming the decrypted summation sequence in the second domain to a second summation sequence that includes a plurality of second summations in the first domain, each of the plurality of second summations being an estimate of a summation of the answers that correspond to a respective query of the query sequence.

11. The method of claim 10, wherein combining the encrypted representations comprises:
    combining the encrypted representations in accordance with a Paillier cryptosystem technique; and
    wherein decrypting the encrypted summation sequence comprises:
    decrypting the encrypted summation sequence in accordance with the Paillier cryptosystem technique.

12. The method of claim 10, wherein providing the query sequence comprises:
    providing a historical recurring query that includes the plurality of queries to the plurality of users.

13. The method of claim 10, wherein providing the query sequence comprises:
    providing a real-time recurring query that includes the plurality of queries to the plurality of users.

14. The method of claim 10, wherein decrypting the encrypted summation sequence comprises:
    decrypting the encrypted summation sequence to provide a differentially private summation sequence based on the decryption shares of at least the threshold number of the users.

15. A system comprising:
    an answer module configured to determine an answer sequence that includes a plurality of answers that corresponds to a plurality of respective queries that are included in a query sequence that is received from a requestor;
    a transform module configured to transform a first representation of the answer sequence in a first domain to a second representation of the answer sequence in a second domain, the first representation including a plurality of first coefficients that corresponds to the plurality of respective answers, the second representation including a plurality of second coefficients, a number of the second coefficients in the plurality of second coefficients being less than a number of the first coefficients in the plurality of first coefficients;
    a noise module configured to add noise to the plurality of second coefficients to provide a noisy representation of the plurality of second coefficients in the second domain;
    an encryption module configured to encrypt the noisy representation in accordance with a homomorphic encryption technique to provide an encrypted representation of the plurality of second coefficients to the requestor; and
    a decryption share module configured to determine a decryption share of the user based on an encrypted summation sequence that is received from the requestor, the decryption share module further configured to provide the decryption share of the user to the requestor to be combined with at least one decryption share of at least one other respective user for decryption of the encrypted summation sequence, the encrypted summation sequence including a plurality of summations, each of the plurality of summations incorporating a respective second coefficient of the noisy representation of the plurality of second coefficients.

16. The system of claim 15, wherein the noise module is configured to generate the noise as Laplace noise using four Gaussian variables.

17. The system of claim 15, wherein the plurality of second coefficients includes a predetermined number of second coefficients.

18. The system of claim 15, further comprising:
    a coefficient determination module configured to determine a number of second coefficients to be included in the plurality of second coefficients based on a reconstruction error and a perturbation error that are associated with the number.

19. The system of claim 15, further comprising:
a modification module configured to append a designated number of placeholder coefficients to the plurality of second coefficients in the noisy representation of the plurality of second coefficients, each of the placeholder coefficients being equal to zero, the designated number being equal to the number of the first coefficients in the plurality of first coefficients minus the number of the second coefficients in the plurality of second coefficients.

20. The system of claim 15, wherein the noise module is configured to add independent noise to each of the second coefficients to provide the noisy representation of the plurality of second coefficients in the second domain.

* * * * *